Oct. 11, 1955 A. E. DENTLER 2,720,320
COMBINED FRICTION AND RUBBER SHOCK ABSORBING MECHANISMS
Filed Nov. 21, 1952 3 Sheets-Sheet 1

Inventor:
Arnold E. Dentler.

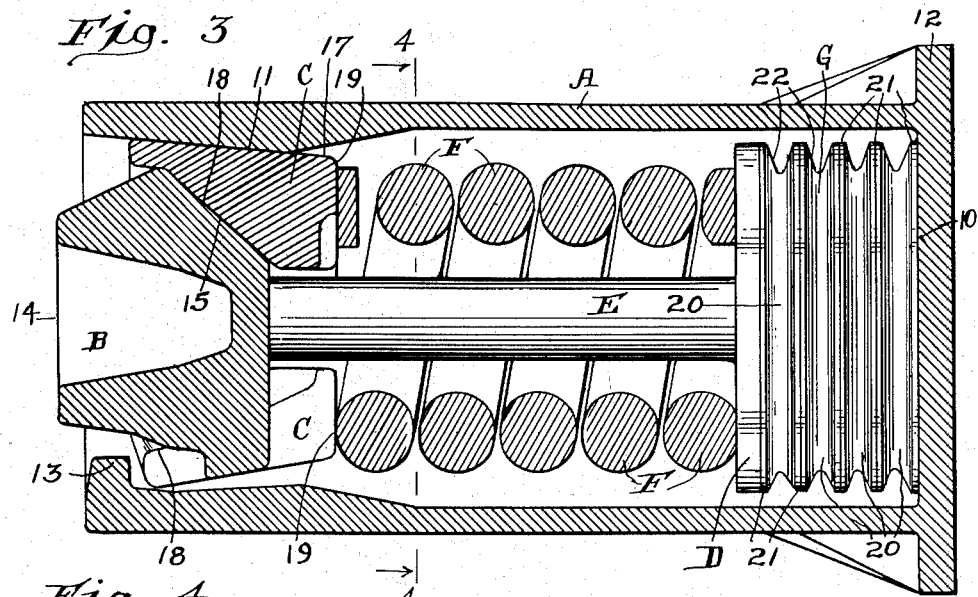
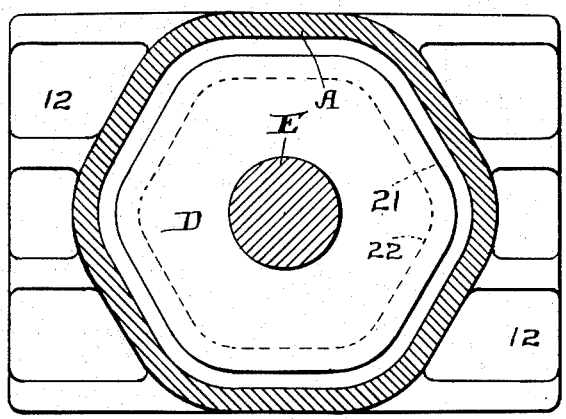
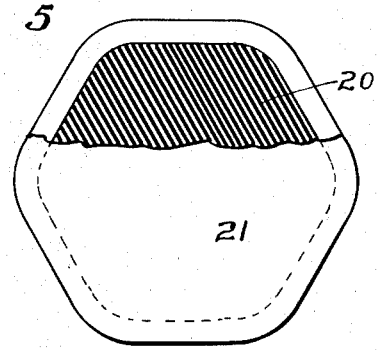
Inventor:
Arnold E. Dentler.

Oct. 11, 1955   A. E. DENTLER   2,720,320
COMBINED FRICTION AND RUBBER SHOCK ABSORBING MECHANISMS
Filed Nov. 21, 1952   3 Sheets-Sheet 3

Inventor:
Arnold E. Dentler.

United States Patent Office 2,720,320
Patented Oct. 11, 1955

2,720,320

COMBINED FRICTION AND RUBBER SHOCK ABSORBING MECHANISMS

Arnold E. Dentler, Western Springs, Ill., assignor to W. H. Miner, Inc., Chicago, Ill., a corporation of Delaware Application November 21, 1952, Serial No. 321,907

10 Claims. (Cl. 213—45)

This invention relates to improvements in shock absorbing mechanisms for railway draft riggings, wherein the shock absorbing capacity is provided by a combination of friction elements and rubber cushioning means.

One object of the invention is to provide a friction shock absorbing mechanism comprising relatively movable friction members, the movement of which is yieldingly resisted by means comprising a helical coil spring and a rubber cushioning element.

A further object of the invention is to provide a mechanism as set forth in the preceding paragraph, wherein the relatively movable friction members include a friction casing and a friction clutch, and wherein the compression force is transmitted to the rubber cushioning element through the medium of the helical coil spring during at least a part of the compression stroke of the mechanism, and means is provided for transmitting the compression force directly from one of the relatively movable friction members to the rubber cushioning element during the last part of said compression stroke.

Another object of the invention is to provide a combined friction and rubber shock absorbing mechanism comprising a friction casing closed at its rear end and having interior friction surfaces at its front end which is open, friction shoes in sliding engagement with the friction surfaces of the casing, a wedge block in wedging engagement with the shoes, a rubber cushioning element within the rear end of the casing, a coiled spring within the casing, bearing on the inner ends of the shoes, a follower interposed between the coiled spring and the rubber cushioning element for transmitting the pressure from the coil spring to the rubber cushioning element during compression of the mechanism, whereby the resistance of the rubber cushioning element is added to that of the spring to yieldingly resist jointly with said spring inward movement of the friction shoes, and a pressure transmitting column member becoming operative after the shoes have travelled inwardly of the casing to a predetermined extent to take over from the spring and deliver to the follower directly, the major portion of the load being transmitted.

Other objects of the invention will more clearly appear from the description and claims hereinafter following.

In the accompanying drawings forming a part of this specification,

Figure 3 is a view similar to Figure 1, showing the mechanism partly compressed.

Figure 4 is a transverse vertical sectional view, corresponding substantially to the line 4—4 of Figure 3, with the wedge, shoes, and helical coil spring omitted. Figure 5 is a plan view of one of the units of the rubber cushioning means or element, the outer spacing plate being partly broken away to show the rubber pad of the unit.

Figure 1:
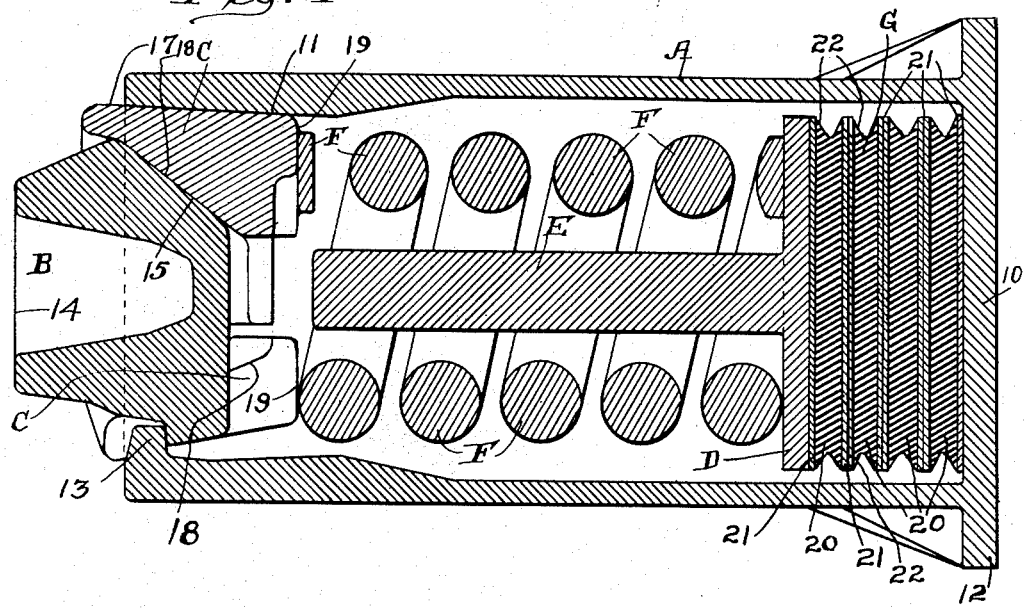
Figure 1 is a horizontal longitudinal sectional view of my improved friction shock absorbing mechanism, said view corresponding substantially to the line 1—1 of Figure 2.
Figure 2:
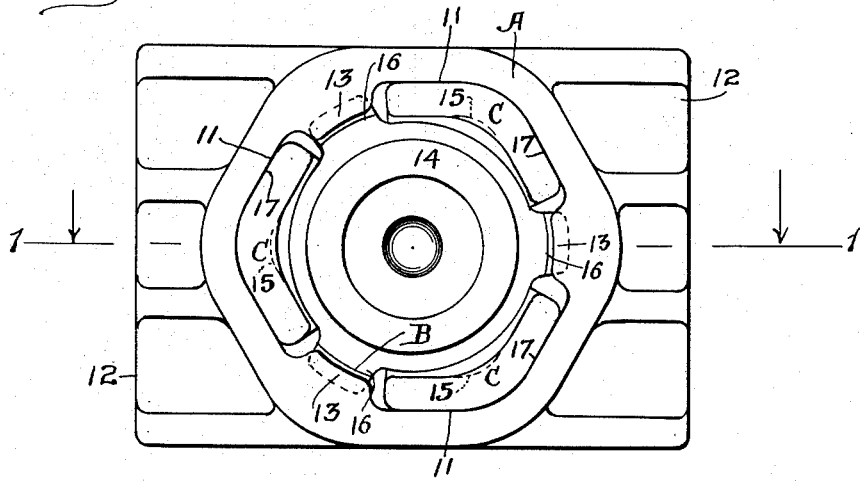
Figure 2 is a front elevational view of Figure 1, looking from left to right in said figure.

Referring first to the embodiment of the invention illustrated in Figures 1 to 5 inclusive, my improved shock absorbing mechanism comprises broadly a friction casing A, a wedge block B, three friction shoes C—C—C, a rear follower D, a pressure transmitting post E, a helical spring F, and a rubber cushioning element G.

The friction casing A is in the form of a tubular member of hexagonal transverse cross section, open at its front end and closed at the rear end by a transverse wall 10. The casing A presents three interior friction surfaces 11—11—11 at its open end, which are of V-shaped transverse cross section, each V-shaped surface being formed by two adjacent inner faces of the hexagonal wall of the casing. The friction surfaces 11—11—11 converge inwardly of the casing, thereby presenting a section of tapered formation. The transverse rear wall 10 of the casing is preferably extended outwardly at opposite sides of the casing and functions as a rear follower 12, which is adapted to cooperate with the usual rear stops of the draft rigging of a railway car.

At the forward or open end thereof, the casing A is provided with three inturned stop lugs 13—13—13 which are equally spaced circumferentially at said open end. These stop lugs provide means with which the wedge block B cooperates for limiting outward movement of the latter and holding the mechanism assembled.

The wedge block B is of generally cylindrical shape having a flat front end face 14 adapted to bear on the usual front follower of a railway draft rigging and receive the actuating force. At the inner end, the wedge block B is provided with three wedge faces 15—15—15 which are arranged symmetrically about the central longitudinal axis of the mechanism and converge rearwardly. Each wedge face 15 is of V-shaped transverse cross section and cooperates with one of the friction shoes C. At the rear end thereof, the block B has three radially projecting lugs 16—16—16 which extend between adjacent shoes C—C, and are engaged in back of the lugs 13—13—13 of the casing A.

The friction shoes C—C—C surround the wedge block B and together with the latter form a friction clutch. The shoes C—C—C are slidingly telescoped within the casing A. Each shoe C has a longitudinally extending friction surface 17 on the outer side thereof, which is of V-shaped transverse cross section and engages with one of the V-shaped friction surfaces 11 of the casing. On the inner side, that is, the side of the shoe which faces the wedge block B, each shoe has a wedge face 18 of V-shaped transverse cross section, correspondingly inclined to and engaged with one of the wedge faces 15 of said wedge block. At the rear end, each shoe C presents a flat transverse face 19 which forms an abutment for the helical spring F.

The rear follower D is in the form of a relatively thick plate of hexagonal outline, which is arranged within the casing A, between the spring F and the rubber cushioning element G.

The pressure transmitting post E is of cylindrical transverse cross section. This post is formed integral with the follower D and projects forwardly therefrom toward the wedge block B. The parts of the mechanism are so proportioned that, in the full release position of the mechanism, as shown in Figure 1, the front end of the post E is spaced an appreciable distance from the inner end of the wedge block B.

The spring F is in the form of a helical coil surrounding the post E and having its front and rear ends bearing, respectively, on the inner ends of the shoes C—C—C and the front side of the follower D.

The rubber cushioning element G comprises a plurality of rubber units, each consisting of a central rubber pad 20 and spacing plates 21—21 vulcanized to the front and rear sides of the same. The rubber pads 20 and the spacing plates 21—21 are preferably of hexagonal outline, and the outer edge faces of the pads 20 are indented or bowed inwardly, as indicated at 22, to accommodate the flow of the material of the pads as the same are compressed, thereby preventing the material of the pads from being squeezed outwardly to an extent to bulge beyond the edges of the spacing plates and be thus subjected to the danger of being damaged.

As shown, the rubber element G comprises four such rubber units, arranged in series between the follower D and the rear wall 10 of the casing A, with the spacing plates 21—21 of adjacent units abutting, and the front plate 21 of the front unit bearing on the rear side of the follower D and the rear spacing plate 21 of the rearmost unit bearing on the wall 10 of the casing A.

In the assembled condition of the mechanism, both the spring F and the rubber element G are under a predetermined amount of initial compression.

The operation of the improved friction shock absorbing mechanism disclosed in Figures 1 to 5 inclusive is as follows: Upon the mechanism being compressed by relative approach of the usual followers of the draft rigging, the wedge block B of the friction clutch, comprising the wedge block B and the friction shoes C—C—C, is forced inwardly or rearwardly of the casing A, thereby setting up a wedging action between the wedge block and the shoes, spreading the latter apart and forcing the same into tight frictional engagement with the friction surfaces of the casing and sliding them inwardly of the casing against the resistance of the spring F and the rubber element G. High frictional resistance is thus provided during the compression stroke of the mechanism. During the first part of the compression stroke, the actuating force to compress the rubber element G is transmitted through the spring F to the follower D and through the latter to said rubber element. This action continues until the inwardly moving wedge block B comes into engagement with the front end of the post E, as illustrated in Figure 3, whereupon the actuating force is delivered directly from the wedge block B to the follower D and the rubber element G during the remainder of the compression stroke of the mechanism, the post E acting as a solid column which assumes the greater portion of the load being transmitted to the rubber element G. However, during this stage of the operation, there is also some further compression of the spring F between the shoes C—C—C and the follower D, due to differential action between the wedge block B and the shoes C—C—C, induced by the tapered formation of the friction surface portion of the friction casing A. In other words, due to contraction of the shoes as a group, the travel inwardly of the shoes takes place in steadily advancing relation with respect to the wedge block B to further compress the spring F against the follower D.

Upon the actuating force being reduced, the expansive action of the spring F and the rubber element G returns the parts to the normal full release position shown in Figure 1, outward movement of the wedge block B being limited by shouldered engagement with the stop lugs 13—13—13 of the casing A.

Figure 6:
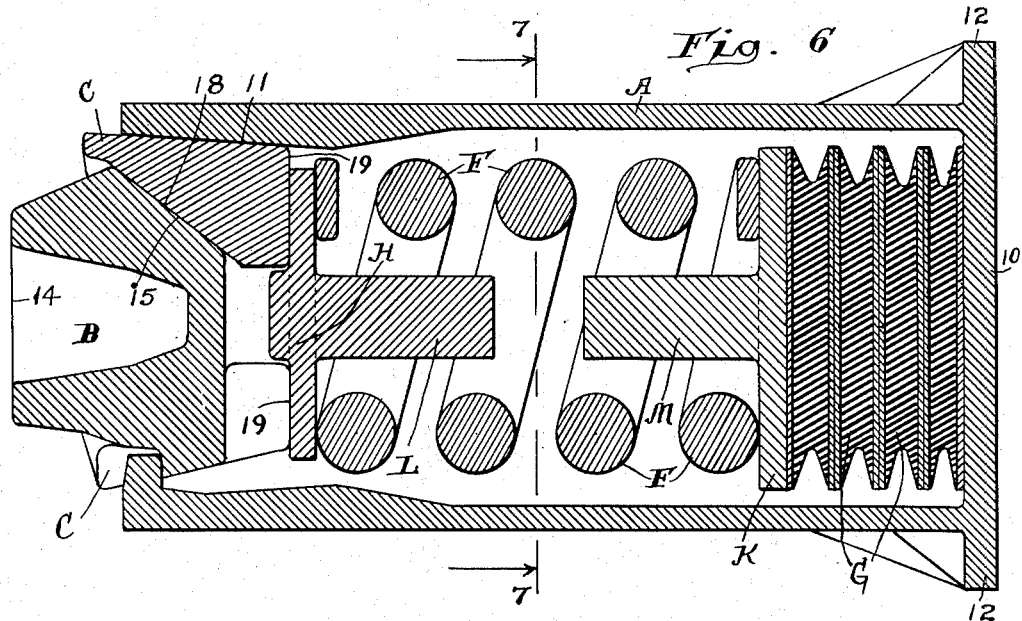
Figure 6 is a view similar to Figure 1, illustrating another embodiment of the invention.
Figure 7:
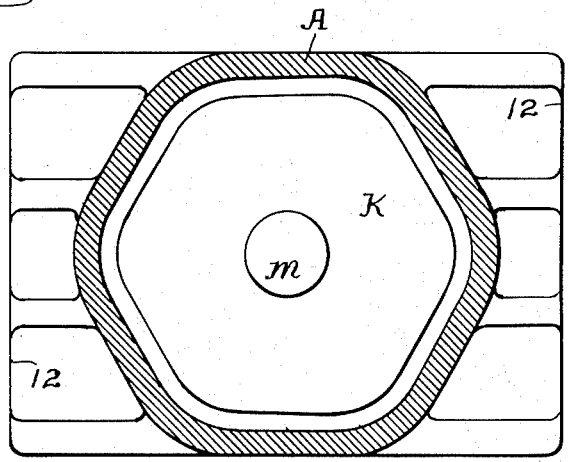
Figure 7 is a transverse, vertical sectional view, corresponding substantially to the line 7—7 of Figure 6, with the wedge, shoes, and front follower omitted.

Referring next to the embodiment of the invention illustrated in Figures 6 and 7, the improved friction shock absorbing mechanism shown comprises a friction casing, wedge block, three friction shoes, a helical coil spring, and a rubber cushioning element, which are all identical with the casing A, wedge block B, friction shoes C—C—C, helical coil spring F, and rubber cushioning element G hereinbefore described and respectively indicated by the same reference characters hereinbefore used for the corresponding parts, and in addition, front and rear followers H and K and front and rear posts L and M.

The front and rear followers H and K are in the form of hexagonal plates, the front follower H bearing on the rear ends of the shoes C—C—C and the rear follower K bearing on the rubber cushioning element G. The front and rear posts L and M are both of cylindrical cross section and extend from the central portions of the followers H and K, respectively, being formed integral with said followers. The posts L and M project toward each other and have their opposed ends spaced a predetermined distance apart.

The spring F surrounds the posts L and M and has its front and rear ends bearing, respectively, on the rear side of the front follower H and the front side of the rear follower K.

The operation of the improved shock absorbing mechanism illustrated in Figures 6 and 7 is as follows: Upon the mechanism being compressed, the wedge block B of the friction clutch is forced inwardly of the casing A, thereby setting up a wedging action, spreading the shoes C—C—C apart, and at the same time forcing the same to slide inwardly of the casing A along the friction surfaces thereof and against the resistance of the spring F and the rubber cushioning element G. During the first part of the compression stroke, the actuating force to compress the rubber element G is transmitted from the shoes C—C—C to the front follower H, through the spring F, to the rear follower K, and through the latter to said rubber element. This action continues until the post L of the front follower H and the post M of the rear follower K come into engagement with each other, whereupon the actuating force is delivered directly from the shoes C—C—C through the posts L and M, which act as a solid column, to the rubber element G, during the remainder of the compression stroke of the mechanism, thereby relieving the spring F from further compression.

I claim:

1. In a friction shock absorbing mechanism, the combination with a friction casing open at one end and closed at the other end by a transverse wall; of a friction clutch slidingly telescoped within said open end of the casing, said clutch including friction shoes in sliding frictional engagement with the interior of the casing, and a wedge in wedging engagement with said shoes; a rubber cushioning element within the casing bearing on said transverse wall; a coil spring buttressed against the inner ends of said friction clutch; a rear follower interposed between and bearing on said coil spring and rubber cushioning element, respectively; and means for transmitting pressure from said clutch to said rear follower, including a rigid column movable inwardly of the casing with said clutch and engaged with said rear follower.

2. In a friction shock absorbing mechanism, the combination with a friction casing open at one end and closed at the other end by a transverse wall; of a friction clutch telescoped within said open end of the casing, said clutch including a plurality of friction shoes in sliding frictional engagement with the interior of the casing, and in wedging engagement with said shoes; a rubber cushioning element within the casing bearing on said transverse wall; a coil spring buttressed against the inner ends of said friction clutch; a rear follower interposed between and bearing on said coil spring and rubber cushioning element, respectively; and means for transmitting pressure from said friction clutch to said rear follower, including a rigid column movable inwardly of the casing with said friction clutch, said column being integral with said rear follower.

3. In a friction shock absorbing mechanism, the combination with a friction casing open at one end and closed at the other end by a transverse wall; of a friction clutch telescoped within said open end of the casing in sliding frictional engagement with the interior of the latter; a rubber cushioning element within the casing bearing on said transverse wall; a coil spring buttressed against the inner ends of said clutch; a rear follower interposed between and bearing on said coil spring and rubber cushioning element, respectively; and means for transmitting pressure from said clutch to said rear follower, including a rigid column on said rear follower, movable inwardly of the casing with said clutch after the mechanism has been compressed to a predetermined extent.

4. In a friction shock absorbing mechanism, the combination with a friction casing open at one end and closed at the other end by a transverse wall; of friction shoes telescoped within said open end of the casing in sliding frictional engagement with the interior of the latter; a wedge member in wedging engagement with said shoes; a rubber cushioning element within the casing bearing on said transverse wall; a coil spring buttressed against the inner ends of said shoes; a rear follower interposed between and bearing on said coil spring and rubber cushioning element, respectively; and means for transmitting pressure from said member to said rear follower, including a solid column extending forwardly from said rear follower and having its front end spaced from said member a predetermined distance, less than the full compression stroke of the mechanism and being engaged by and movable inwardly of the casing with said member after the mechanism has been compressed to a predetermined extent.

5. In a friction shock absorbing mechanism, the combination with a friction casing open at one end and closed at the other end by a transverse wall; of friction shoes telescoped within said open end of the casing in sliding frictional engagement with the interior of the latter; a wedge member in wedging engagement with said shoes; a rubber cushioning element within the casing bearing on said transverse wall; a coil spring buttressed against the inner ends of said shoes; a rear follower interposed between and bearing on said coil spring and rubber cushioning element, respectively; and means for transmitting pressure from said wedge member to said rear follower, including a solid column integral with said rear follower and having its front spaced from said wedge member, said column being engaged by and movable inwardly of the casing with said wedge member after the mechanism has been compressed to a predetermined extent.

6. In a friction shock absorbing mechanism, the combination with a friction casing open at one end and closed at the other end by a transverse wall; of friction shoe members telescoped within said open end of the casing in sliding frictional engagement with the interior of the latter; a wedge member in wedging engagement with said shoe members; a rubber cushioning element within the casing bearing on said transverse wall; a coil spring bearing on the inner ends of said shoe members; a rear follower interposed between and bearing on said coil spring and rubber cushioning element, respectively; and a forwardly extending post on said rear follower projecting toward said wedge member and having its front end spaced rearwardly from said wedge member a distance less than the full compression stroke of the mechanism.

7. In a friction shock absorbing mechanism, the combination with a friction casing open at one end and closed at the other end by a transverse wall; of friction shoes telescoped within said open end of the casing in sliding frictional engagement with the interior of the latter; a wedge member in wedging engagement with said shoes; a rubber cushioning element within the casing bearing on said transverse wall; a front follower bearing on the inner ends of said shoes, a coil spring bearing on said front follower; a rear follower interposed between and bearing on said coil spring and rubber cushioning element, respectively; and a forwardly projecting post on said rear follower engageable by said front follower to transmit pressure from said shoes to said rear follower.

8. In a friction shock absorbing mechanism, the combination with a friction casing open at one end and closed at the other end by a transverse wall; of friction shoes telescoped within said open end of the casing in sliding frictional engagement with the interior of the latter; a wedge member in wedging engagement with said shoes; a rubber cushioning element within the casing bearing on said transverse wall; a coil spring within said casing; a rear follower interposed between and bearing on said coil spring and rubber cushioning element, respectively; and means for transmitting pressure from one of said shoes to said rear follower, including a front follower interposed between said shoes and coil spring, a rearwardly projecting post on said front follower, and a forwardly projecting post on said rear follower engaged by said first named post and movable inwardly of the casing therewith after said mechanism has been compressed to a predetermined extent.

9. In a friction shock absorbing mechanism, the combination with a friction casing open at one end and closed at the other end by a transverse wall; of friction shoes telescoped within said open end of the casing in sliding frictional engagement with the interior of the latter; a wedge member in wedging engagement with said shoes; a rubber cushioning element within the casing bearing on said transverse wall; a coil spring within said casing; a rear follower interposed between and bearing on said coil spring and rubber cushioning element, respectively; and means for transmitting pressure from one of said shoes to said rear follower, including a front follower bearing on said shoes and the front end of said coil spring, a rearwardly projecting post on said front follower, a forwardly projecting post on said rear follower having its front end spaced rearwardly from said first named post less than the full compression stroke of the mechanism, and engaged by said first named post after said space is taken up, to move inwardly of the casing with said shoes to actuate said rear follower.

10. In a friction shock absorbing mechanism, the combination with a friction casing open at one end and closed at the other end by a transverse wall; of friction shoe members telescoped within said open end of the casing in sliding frictional engagement with the interior of the latter; a wedge member in wedging engagement with said shoe members; a rubber cushioning element within the casing bearing on said transverse wall; a coil spring buttressed against the inner ends of said shoe members; a rear follower interposed between and bearing on said coil spring and rubber cushioning element, respectively; and means for transmitting pressure from one of said shoe members to said rear follower, including a front follower bearing on said last named member, a rearwardly projecting post on said front follower, and a solid column engaged by said post and movable inwardly of the casing with said last named member and engaged with said rear follower, said column being integral with said rear follower.

No references cited.